INVENTORS
Rene A. Baudry &
Paul R. Heller.
BY O.B.Buchanan
ATTORNEY

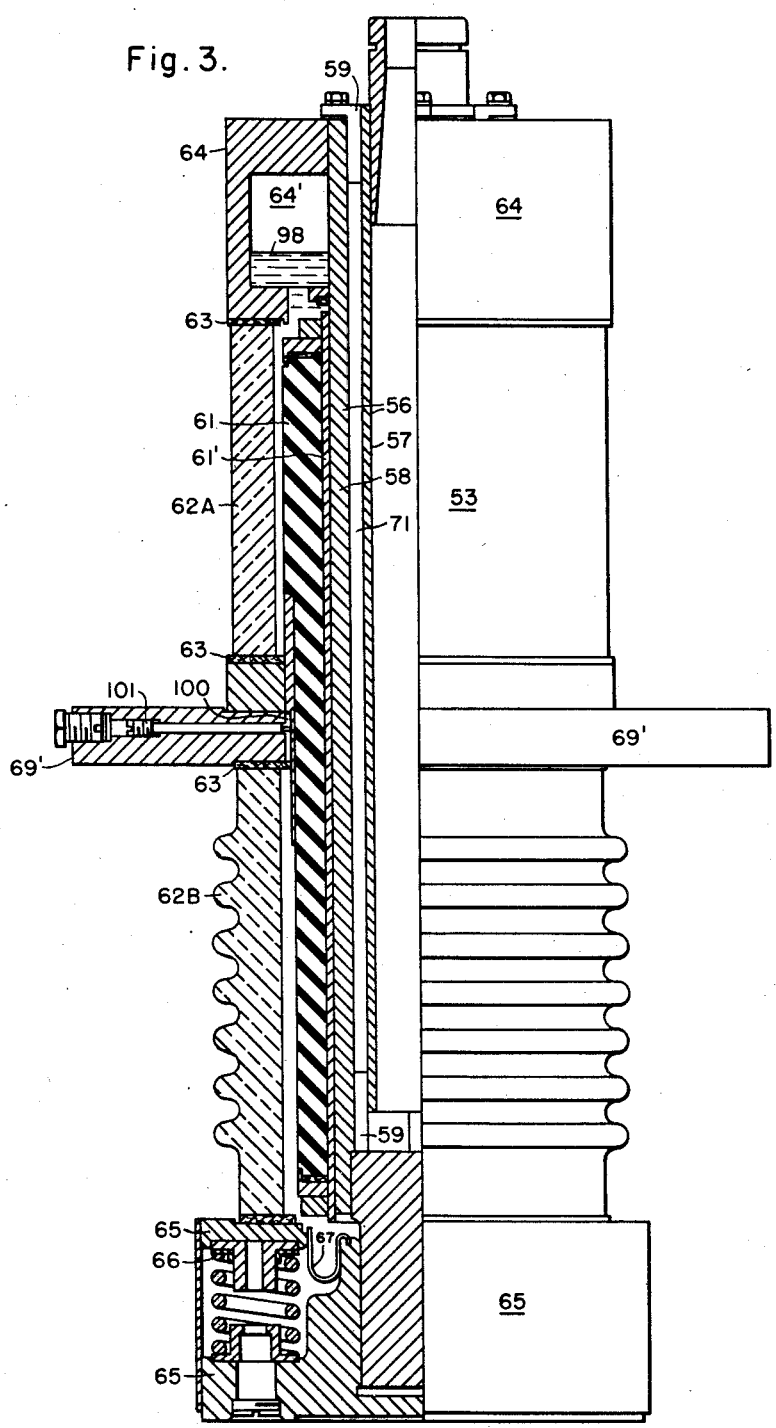

United States Patent Office 2,828,428
Patented Mar. 25, 1958

2,828,428

CONDUCTOR-VENTILATED GENERATORS

René André Baudry, Pittsburgh, and Paul R. Heller, Irwin, Pa., assignors to Westinghouse Electric Corporation, East Pittsburgh, Pa., a corporation of Pennsylvania Application February 17, 1955, Serial No. 488,938

7 Claims. (Cl. 310—64)

Our present invention relates to improvements in innercooled or conductor-ventilated generators, such as are shown and described in our pending application Serial No. 248,852, filed September 28, 1951, now Patent No. 2,780,739, issued February 5, 1957. Such generators are large, high-speed, three-phase, 50 or 60-cycle, two-pole, hydrogen-cooled generators which are driven by steam turbines, or any similar generators or dynamo-electric machines. They are characterized by having insulated stator-windings which are provided with cooling or ventilating ducts which are in close heat-exchange relation to the winding-conductors, so that the heat is removed directly from these conductors, without having to pass through the surrounding insulation.

As the sizes of such machines are pressed to higher and higher limits, it becomes evident that something must be done about applying the ventilated-conductor principle to both the terminal-lead bushings and the circumferentially extending end-connections, so as to increase their current-carrying ratings. Our present invention relates to practical means for innercooling these bushings and end-connections or connectors.

Figure 1:
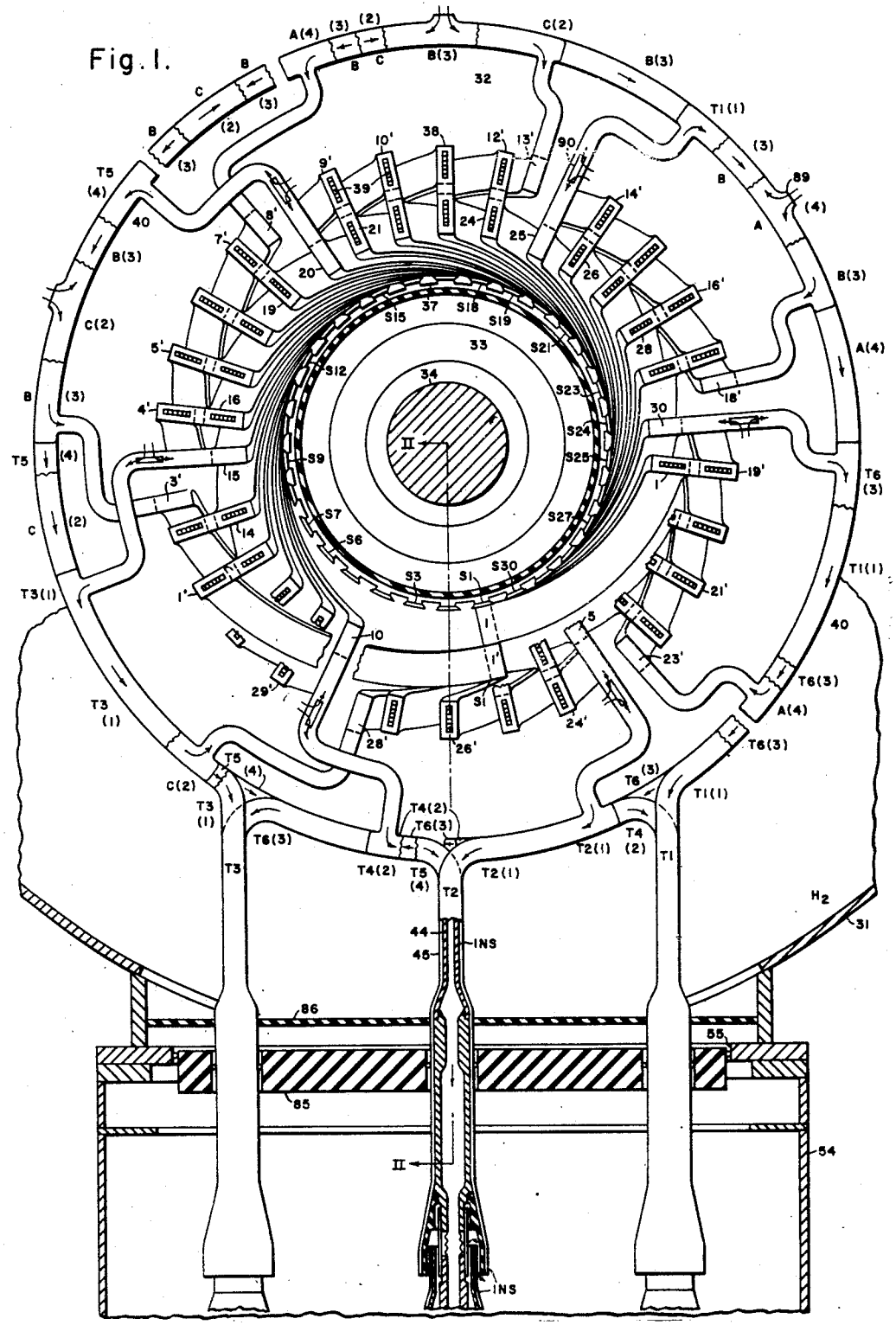
Figure 2A:
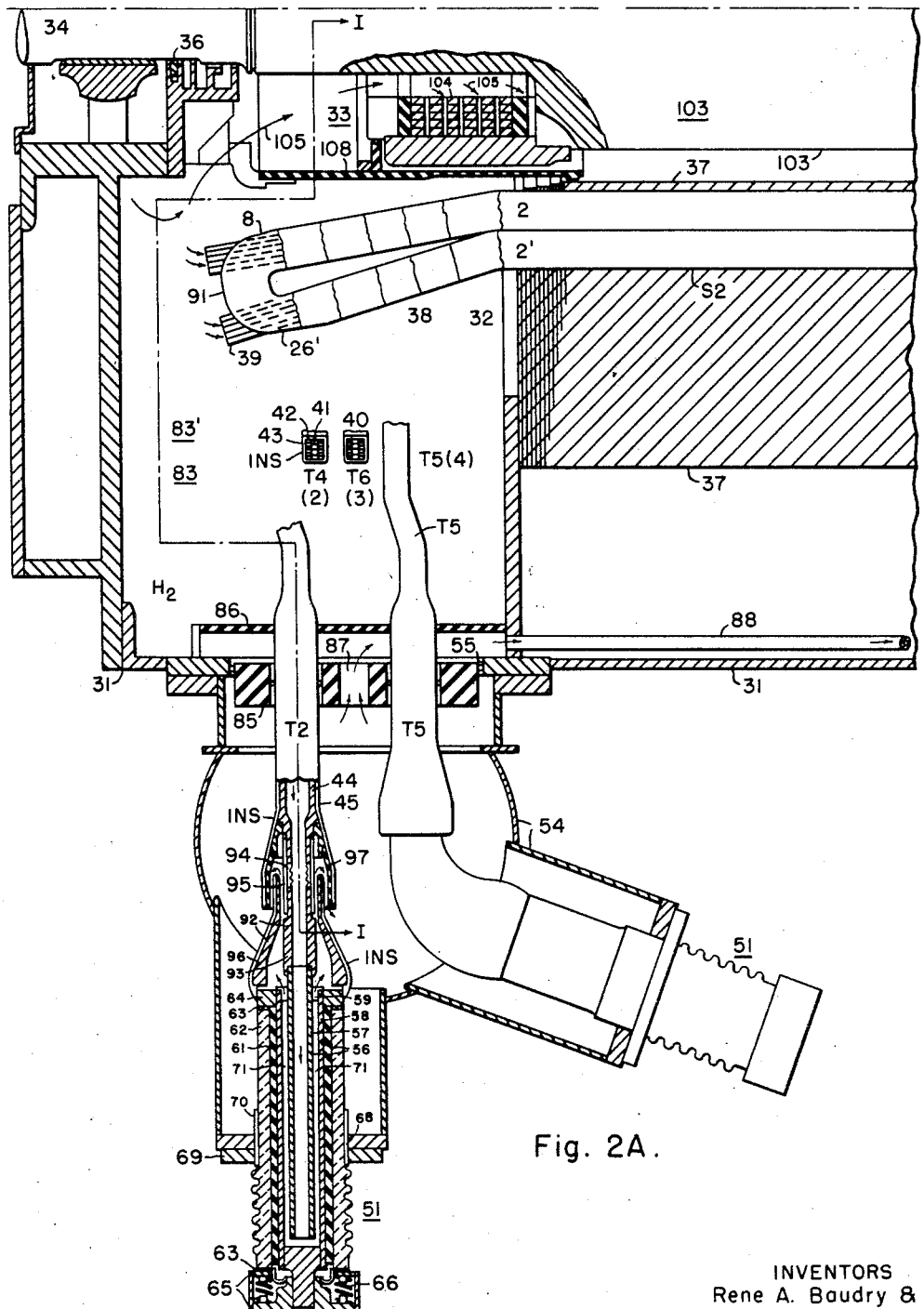
Figure 2B:
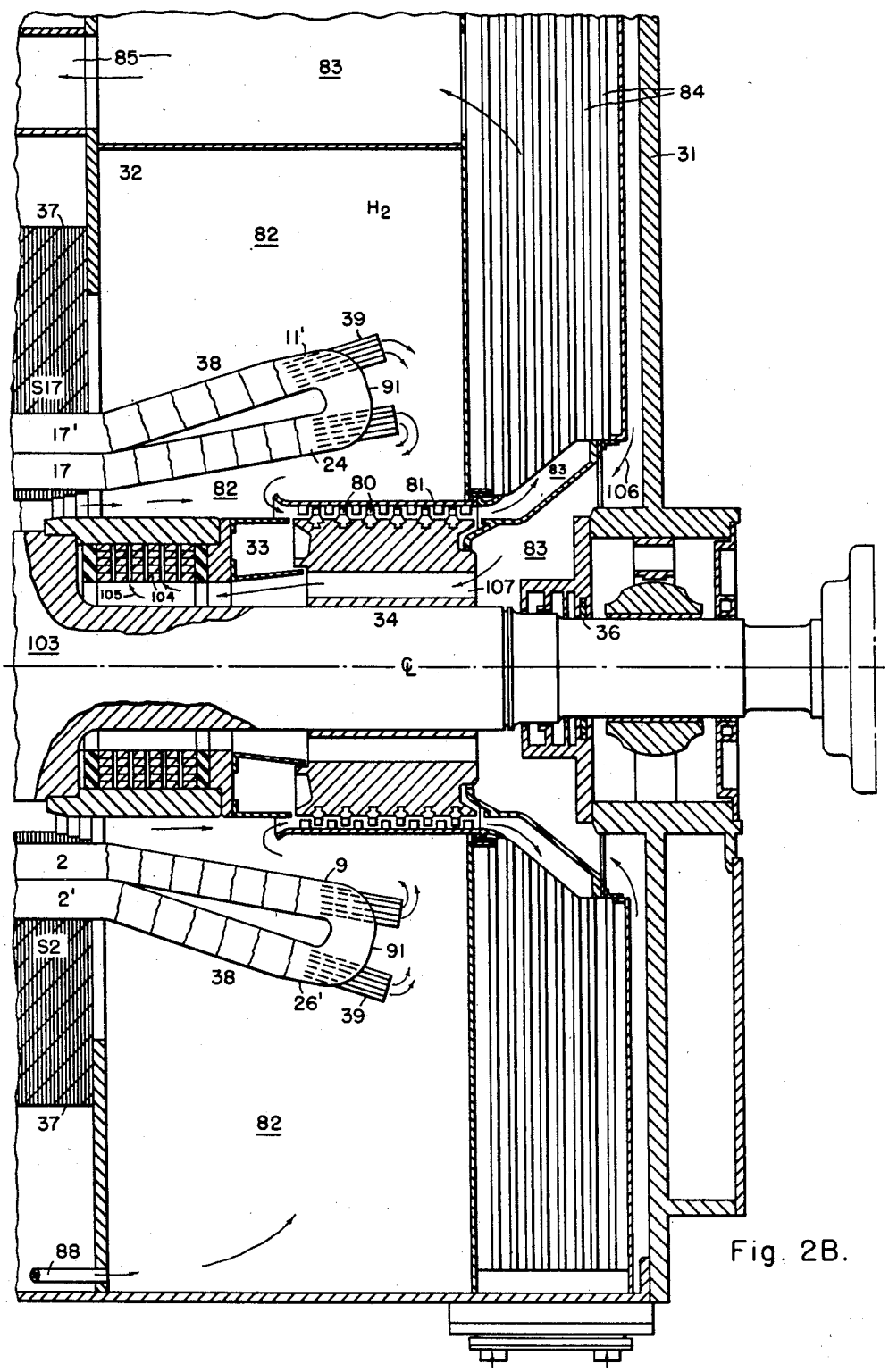

Exemplary forms of embodiment of our invention are shown in the accompanying drawing, wherein Figure 1 is a somewhat diagrammatic fragmentary transverse sectional end-view of an exemplary turbine-generator embodying our invention, the section-plane being indicated approximately by the line I—I in Fig. 2A, Figs. 2A and 2B are somewhat diagrammatic fragmentary longitudinal sectional views of the front and rear ends, respectively, of the machine shown in Fig. 1, the section-plane being indicated approximately by the line II—II of Fig. 1, and Fig. 3 is a somewhat diagrammatic vertical longitudinal sectional view of a different form of conductor-ventilated terminal-lead bushing, which could be substituted for that which is shown in Fig. 2A.

The drawings are not to scale, and they freely omit irrelevant braces, supports, and other parts and structural details which are not necessary to an explanation of our present invention.

In Figs. 1, 2A and 2B, we have shown our invention, by way of illustration, in what we now consider to be a preferred form of embodiment, using what is known as the single-direction cooling-system of our pending application Serial No. 394,602, filed November 27, 1953, now Patent No. 2,707,243, issued April 26, 1955, but we are not necessarily limited to this particular general form of embodiment.

We have shown a cooled high-current synchronous machine having a fluid-tight machine-housing 31 having a fluid coolant therein, which is preferably a filling of a gas, such as hydrogen, under pressure. Within the machine-housing are disposed a stator-member 32 and a rotor-member 33, the latter being carried by a shaft 34 which extends through the machine-housing through bearings 35 and a gland-seal 36.

The stator-member 32 includes a cylindrical-bore stator-core 37, having winding-receiving slots S1 to S30. The stator-member 32 also includes a two-layer ventilated-conductor three-phase stator-winding 38 having top half-coils 1 to 30 and bottom half-coils 1' to 30', with coil-sides lying respectively in the tops and the bottoms of the correspondingly numbered slots S1 to S30. The stator-winding 38 is illustrated as being made up of innercooled insulated conductors of the general type which is broadly described and claimed in a pending Baudry application Serial No. 248,853, filed September 28, 1951, with a preferred specific construction, which is shown in our previously mentioned application Serial No. 248,852, and which is characterized by having a stack of open-ended ducts 39 for innercooling the conductors of the stator-winding half-coils 1 to 30 and 1' to 30', respectively.

At the front or terminal end of the machine, as shown in Figs. 1 and 2A, the stator-winding 38 is provided, in accordance with our present invention, with a plurality of ventilated-conductor, circumferentially extending, end-connectors or connections, which are generally indicated by the numeral 40. These end-connections are sometimes referred to under the general terminology, parallel leads and connectors, although, in the strictest sense of the term, we do not use, in our illustrated machine, a parallel-circuit winding such as would have to have parallel leads and connectors between the respective circuits. Our illustrated end-connections 40 are of two kinds. One kind comprises a plurality of ventilated-conductor series connectors A, B and C, for connecting the diametrically opposite phase-groups of the three phases, respectively, the description "diametrically opposite" alluding to the fact that the illustrated machine has a two-pole winding. A second kind of end-connections 40, in our illustrated machine, comprises a plurality of ventilated-conductor terminal-lead connectors T1 to T6, of which the connectors T1 to T3 are the main terminals for the respective phases, while the connectors T4 to T6 are the corresponding neutral terminals.

These series connectors A, B and C, and terminal-lead connectors T1 to T6, each have circumferentially extending portions which are disposed in a pluraltiy of axially spaced circles or rings, rigidly supported at the front end of the stator-member 32. In the illustrated form of embodiment of our invention, there are four such rings of end-connections, or rather four planes or circles or positions in which the circumferentially extending parts of the end-connections lie, and these four positions are indicated by parenthetically added numbers (1) to (4) in Figs. 1 and 2, in order to facilitate an understanding of the construction. This arrangement of the end-connections in a plurality of different rings or positions is known, in general principle, in the art.

In accordance with our present invention, all of the end-connections 40 are of the ventilated-conductor or innercooled type, in which suitable ventilating ducts are provided in good heat-exchanging relation to the respective conductors of these connections. No set form of innercooling is prescribed for these end-connections. In fact, portions of them may be in the form shown in Fig. 2A for the terminal-lead connectors T4 and T6, consisting of a stack of ducts 41, disposed between two stacks of conductor-strands 42, bound around by taped insulation 43. On the other hand, the vertically extending end-portion of the terminal-lead connector T2, as shown in Figs. 1 and 2A, may consist simply of a tubular-shaped conductor 44, surrounded by insulation 45. Either one or both of these forms of innercooling construction, or any equivalent device or assembly, may be used for the various innercooled conductors of our invention, according to the construction which is found to be the most practicable. The necessary electrical and fluid connections between separate parts can be made by any suitable joinery, which is not important to our invention, and which is not seen in the drawing, since the whole is covered by insulation, which is all that is seen in the conductor-parts which are shown in elevation in our drawing.

Our invention also uses innercooled or ventilated-conductor terminal-lead bushings, such as are shown at 51 in Fig. 2A, or at 53 in Fig. 3. These bushings extend through the machine-housing 31, and usually they extend through a lead-box 54, which is usually hermetically disposed around the outside of an opening 55 in the bottom of the machine-housing 31, so that the lead-box really forms a part of the hermetic enclosure or housing of the machine, in the broader sense of the word housing. Any suitable ventilated-conductor construction can be used for these bushings, whereby the hydrogen (or any other cooling fluid) may be introduced into, and discharged from, an internal circulating passage of the bushing, so as to cool the lead-in conductor 56 thereof.

In the form of bushing-construction which is shown in Fig. 2A, the bushing 51 includes two centrally disposed tubular members 57 and 58, in substantially concentric spaced relation to each other, at least one of which is of conducting material to constitute the lead-in conductor of the bushing. In the illustrated form of construction, as shown in Fig. 2A, both of these tubular members 57 and 58 are of copper, and both together constitute the lead-in conductor, these two tubular members being mechanically spaced and electrically joined by means of suitable spacer-blocks 59. The outer tubular member 58 is surrounded by a tube or cylinder of insulation 61.

The bushing 51 is provided with a suitable bushing-housing-means, which, in Fig. 2, is shown as comprising a single longitudinally extending external tube or cylinder 62 of porcelain, zircon porcelain, or other suitable insulating-material. The top and bottom ends of the porcelain 62 are provided with sealing-gaskets 63, which are held under compression between flanged head-members 64 and 65 on the respective ends of the lead-in conductor 56—57—58. These sealing-gaskets are held in compression by suitable springs 66, which are preferably carried by the lowermost or outer head-member 65, and the gas-tightness of this lowermost head-member 65 is maintained by a suitable diaphragm 67, so that this head-member 65 constitutes an enclosed outer end for the gas-tight bushing-housing of which the porcelain 62 is an essential part.

The bushing 51 of Fig. 2A is mounted in a suitable hole 68 in the lead-box 54, by means of a mounting-flange or ring 69, which is externally carried by an intermediate portion of the porcelain 62, preferably being secured to a suitable metallic coating or shrunk-on sleeve 70 on said porcelain.

In the illustrated construction of the bushing 51 in Fig. 2A, the inner concentric tubular member 57 stops short of the closed bottom head-member 65, thus providing a direct communicating channel between the outer or lower end of the inner tubular member 57 and the outer or lower end of the annular space 71 between the two concentric tubular members 57 and 58. The top end of the inner tubular member 57 and the top end of this annular space 71 are both open, so that one of these open top ends constitutes the fluid-inlet, and the other constitutes the fluid-outlet, for the cooling fluid wherewith the bushing is ventilated or cooled.

Some suitable recirculating cooling-system has to be provided for the machine. The illustrated preferred form of embodiment of our machine uses the so-called single-direction cooling-system of our previously mentioned application Serial No. 394,602. This recirculating system uses the hydrogen which fills the machine-housing, as the fluid coolant, although it will be understood that other recirculating systems could be used. At the back end of the machine, as shown in Fig. 2B, the rotor-member 33 is provided with a gas-moving means in the form of a single evacuating blower 80, which evacuates hot gas from that end of the air gap between the stator and rotor members. The blower 80 is provided with a shroud 81, which separates the entrance-zone 82 of the blower from the discharge-zone 83 thereof. The entrance-zone 82 thus constitutes a relatively low-pressure stator-winding ventilating-zone for the conductor-cooling gas at this back end of the machine. The stator-winding ventilating-ducts 39 are all open into this relatively low-pressure zone 82 at this back end of the machine, as shown in Fig. 2B.

The discharge-zone 83 of the blower 80 in Fig. 2B is the relatively high-pressure ventilating-zone of the gas which is used to ventilate the stator-winding conductors in the illustrated form of embodiment of our invention. In this high-pressure zone 83, as illustrated, the gas is first passed through vertical coolers 84, such as are shown and claimed in a pending Baudry application Serial No. 389,349, filed October 30, 1953, now Patent No. 2,707,242, issued April 26, 1955. From the coolers 84, the gas of the high-pressure zone 83 is discharged through longitudinally extending stator-ducts 85, diagrammatically shown near the top of the machine, and feeding into the stator-winding end-zone space 83' at the front end of the machine, which is shown in Fig. 2A, thus establishing this space as part of the high-pressure ventilating-zone 83 of the gas which ventilates the front or end-conductor end of the machine as shown in Figs. 1 and 2A. Most of the stator-winding cooling-ducts 39 at this front end of the machine are open to this high-pressure end-zone space 83', thus serving as gas-inlet means for admitting gas into the ventilating portions of the stator-winding 38.

In the illustrated form of embodiment of our present invention, we divert some of the same supply of cooling-fluid which ventilates the innercooled stator-winding conductors, to serve as the ventilating-fluid which ventilates the innercooled end-connections 40 and the innercooled bushings 51 and/or 53. As illustrated, we show, and we prefer to use, the hydrogen with which the machine-housing is filled, as the recirculated coolant, although we are not limited to such use. In the broader aspects of our present invention, we may use any means for innercooling the end-connections 40 and the bushings 51, 52 and 53, either separately from each other, or in any combinations of serially connected ventilating-fluid channels whereby any stream of ventilating-fluid passes successively through two or more different parts. In general, it is necessary or highly desirable for the entrance-fluid to be admitted from some portion of the high-pressure zone 83 of whatever ventilating-fluid is used in the machine, and for the discharge-fluid to be discharged into some portion of the relatively low-pressure zone 82 at the opposite end of the machine.

In accordance with our present invention, we find it particularly advantageous to discharge the ventilating-fluid of the ventilating passages of at least some of the end-connections 40 into the entrance-passage of the conductor-cooled bushings 51 and/or 53, so that we can provide a common discharge-means for conducting this fluid to the back end of the machine, and specifically to the low-pressure zone 82 thereof. All six of these bushings, in accordance with a common practice, are disposed in the same lead-box 54. According to our invention, we separate this lead-box 54 from the inside of the machine-housing 31 by means of a fairly gas-tight insulating barrier 85, which extends across the opening 55 in the housing 31, and which makes a substantially gas-tight junction with the outside surfaces of the six terminal-lead connectors T1 to T6 which extend through this barrier. We discharge the ventilating-gas of all six bushings into the space within the lead-box 54. We also provide a second or upper insulating barrier or duct-work 86, spaced above the main barrier 85, and closing a space thereabove. The main barrier 85 is provided with one or more outlet-openings 87, which exhaust the gas into the space underneath the upper barrier 86, and from this latter space the gas is exhausted, through one or more longitudinally extending pipes 88, to the low-pressure end-zone 82 at the back end of the machine.

We have devised a simple ventilating-means for ventilating the several end-connections 40, as shown in Fig. 1 of the drawing. This system is predicated partly on the fact that the bottom half-coils 1' to 30' of the stator-winding 38 are not heated as much as the top half-coils 1 to 30, because there is more flux-leakage, and hence more eddy-current loss, in the top halves of the winding-receiving slots S1 to S30 of the stator-core 37. We have arranged our electrical connections to our series connectors A, B and C, so that each series connector is connected between two different bottom half-coils, such as 8' and 23' for the connector A, 18' and 3', for the connector B, and 28' and 13' for the connector C. We then provide each of these three connectors A, B and C, near the middle thereof, with an inlet-opening 89, as shown for A in Fig. 1, so that the high-pressure gas enters these series connectors A, B and C at their respective inlet-openings 89. We provide a gas-communicating connection which discharges the gas from the respective ends of these series connections A, B and C into the ends of the six bottom half-coils to which they are respectively electrically connected, as indicated by the arrows in Fig. 1.

In this illustrated form of embodiment of our invention, all six of the terminal-lead connectors T1 to T6 are thus connected to top coil-halves, the respective coil-halves being numbered 25, 5, 15, 10, 20 and 30. Near the winding-connection ends of these six terminal-lead connectors T1 to T6, we provide inlet-openings 90, as shown for T1 in Fig. 1. Each of these inlet-openings 90 admits two streams of high-pressure gas, one flowing through the connected stator-winding half-coil, while the other flows through the terminal-lead connector to the corresponding bushing 51 or 53, so that the gas then flows serially through the associated bushing before it is discharged into the inside of the lead-box 54, and thence through the longitudinally extending pipe 88 into the low-pressure zone 82 at the rear end of the machine.

At the high-pressure zone 83' at the front end of the machine, each stator-winding half-coil which is not at the end of a phase-zone, that is, each stator-winding half-coil which is not ventilated through one of the inlet-openings 89 or 90 of the end-connections 40, is directly ventilated by having the ends of its ventilating-ducts 39 open directly into said high-pressure zone 83', as shown in Figs. 1 and 2A.

While we are not limited to any particular winding-connections, it might facilitate a reading of the drawing to know the connections of the particular stator-winding 38 which we have chosen to illustrate. There are three phases, each consisting of two phase-zones which are connected by the series connectors A, B and C, respectively. It will be understood that all of the half-coils except those which constitute the terminals of the six phase-zones are connected in series with each other, at their ends, at both the front and back ends of the machine, as indicated by the winding-apex connections 91 between the appropriate top and bottom coil-sides, as shown in Figs. 1, 2A and 2B. The illustrated stator-winding has the following connections:

T1 (A-main) to 25, 12', 24, 11', 23, 10', 22, 9', 21, 8' to A to 23', 6, 24', 7, 25', 8, 26', 9, 27', 10 to T4 (A-neutral).

T2 (B-main) to 5, 22', 4, 21', 3, 20', 2, 19', 1, 18' to B to 3', 16, 4', 17, 5', 18, 6' 19, 7', 20 to T5 (B-neutral).

T3 (C-main) to 15, 2', 14, 1', 13, 30', 12, 29', 11, 28' to C to 13', 26, 14', 27, 15', 28, 16', 29, 17', 30 to T6 (C-neutral).

In Fig. 2A, we have shown an advantageous construction whereby electrical, mechanical, and gas-flow connections are made between the terminal-lead connector T2 (for example) and the bushing 51. The lower portion of the terminal-lead connector T2, which extends through the two spaced barriers 86 and 85, is an insulated hollow conductor which provides a direct communicating channel between the high-pressure zone 83, 83', and the bottom end of this hollow conductor, which is at some point inside of the lead-box 54. To join the bottom end of this terminal-lead connector T2 to the top of the bushing 51, in Fig. 2A, we provide a flexible connector and adapter 92, which includes a centrally disposed hollow conductor 93, which makes a fluid and electrical connection with the top of the inner concentric tubular member 57 of the bushing. The top of this hollow conductor 93 is flexibly joined to the bottom of the hollow terminal-lead conductor T2 by means of a flexible connecting-tube 94 for gas-conduction, and a plurality of flexible conductors or pigtails 95 for electrical conduction. The bottom of the adapter 92 is illustrated as being provided with a funnel-like member 96, which receives the gas which is discharged from the upper end of the annular space 71 between the concentric tubular members 57 and 58 of the bushing. The funnel-like member 96 directs this gas up close around the space surrounding the flexible pigtails 95. The bottom end of the hollow terminal-lead conductor T2 may, or may not, be provided with a skirt-like insulating sleeve 97, the lower end of which is spaced around the upper end of the funnel 96, to direct the escaping gas downwardly and to provide an increased insulation creepage-distance, when needed.

The flexible gaseous and electrical connections 94 and 95 constitute a new and valuable feature of our invention, which prevents the internal vibrations of the machine from being transmitted to the bushings, and which provides the mechanical flexibility which is necessary to facilitate the making of the assembly-connections in the field, and to obviate the necessity for holding the structural dimensions to almost impossibly close tolerances. Our construction of the flexible connector and adapter 92 is such as to facilitate the assembly. It is understood that insulation is wound around all of the parts, wherever necessary, before, during or after the assembly.

The operation of our illustrated end-connection and terminal ventilation, in cooperation with the ventilation of the conductor-cooled stator-winding 38, has already been indicated during the course of the description. In brief summary, it may be noted that, in the particular ventilating-system which we have chosen to illustrate as our preferred form of embodiment, hydrogen enters the centrally disposed inlet-openings 89 of the three series connectors A, B and C in Fig. 1, dividing, in each case, into two streams which flow to the respective ends of these connectors, and thence into the several half-coils 8', 23', 18', 3', 28' and 13', to which these connectors are severally connected. Hydrogen also enters through the inlet-openings 90 near the stator-winding ends of the six terminal-lead conductors T1 to T6 in Fig. 1, and also divides into two streams in each case, one stream passing directly into the ventilating-ducts 39 of the several coil-sides 25, 5, 15, 10, 20 and 30, while the other stream passes downwardly through the terminal-lead connector into the associated bushing 51.

The hydrogen enters the bushing 51, as shown in Fig. 2A, through the inner concentric tubular member 57 of the bushing, then reverses and leaves the bushing at the top, through the annular space 71 between the two concentric tubular members 57 and 58. The funnel member 96 of the flexible connector and adapter 92 then guides this discharged gas up into cooling contact with the flexible pigtails 95, after which the gas is discharged into the space within the lead-box 54, whence it escapes through the outlet-opening 87 in the barrier 85, and thence through the longitudinally extending pipe or pipes 88 to the low-pressure zone 82 at the rear end of the machine, which is shown in Fig. 2B. It will be understood that appropriate insulation and insulating creepage-surfaces are provided between all points which are at different electrical potentials.

One feature of our invention relates to a twofold sealing-means which is advantageously applied to the bushings, for the purpose of guarding against possible sudden loss of the hydrogen-pressure within the main machine-housing 31. Because of the smallness of the scale in Figs. 1 and 2A, we did not attempt to show this particular bushing-feature in these figures, but showed a bushing-design which is more or less conventional, except for the innercooling features, as described more particularly in connection with the bushing 51.

We have shown the twofold seal-preserving bushing-construction in Fig. 3, which is drawn to a considerably larger scale than Figs. 1 and 2A. This Fig. 3 shows a bushing 53 which can, and preferably will be, substituted for the simpler form of innercooled bushing 51 which is shown in Fig. 2A.

By way of background to the story of the new doubly sealed bushing-construction of Fig. 3, it may be observed that these bushings are commonly placed underneath the turbo-generator, where they are subjected to possible water-drippings, and to mechanical strains, which usually make it desirable to treat the bushing as an outer bushing, which commonly uses porcelain or other insulation which is water-resistant or does not absorb moisture. It is also quite desirable that this insulation should be inorganic, so that it will not track or form a carbon path, when subjected to the play of an arc. It is also quite desirable that this insulation should be mechanically stable, so that it will remain permanently in the same shape, without slow mechanical creep or permanent deformation, when subjected to mechanical strain over a long period of time. These properties are all possessed by porcelain, but this material is subject to the disadvantage that they are brittle, and are thus subject to cracking and breakage when subjected either to mechanical blows or a thermal strain such as might be caused by a flashover. When a single insulator is used, as shown at 62 in Fig. 2A, if either the upper or lower end of the bushing should become damaged (that is, either the inner or outer half-end thereof, expressed in terms of its relation to the electrical machine to which it is connected), then the porcelain or zircon bushing is apt to crack all the way down, so that it is no longer gas-tight, but may, in such a case, cause a loss of the hydrogen-pressure within the machine.

In our doubly sealed bushing-construction which is shown in Fig. 3 we use both the external porcelain or zircon insulation and the internal insulating tube 61 as a sealing-means, or rather we use the inner insulating tube 61 as a secondary sealing-means in case of breakage of the outer porcelain or zircon insulation, and we provide a novel structure whereby the escape of hydrogen is limited to a tolerable rate, in case of accident, so that the hydrogen-pressure can be maintained within the main machine-housing 31, for a time which is long enough for some convenient low-load period to be reached, at which time the machine can be conveniently taken out of service for repairs. The inner insulating tube 61 is conveniently made of impregnated wrapped paper, or other insulating material which is not brittle like porcelain or zircon, and which is capable of sustaining compression-surfaces and shear areas which will hold up for a short but adequate period of time, even under high gas-pressure operation, until repairs can be made. However, this wrapped-paper insulation is usually considered inferior to porcelain or zircon in regard to water-resistance, and in regard to mechanical stability against slow mechanical creep or permanent deformation.

In the actual construction of the doubly sealed bushing of Fig. 3, the inner insulating tube 61 is mounted tightly on a mandrel or bushing, in the form of a thin metal sleeve or tube 61', which is slidable over the outer concentric tubular member 58 with a fit of a thousandth of an inch, or other close fit, which is close enough, in consideration of the length of the tube, to limit the escape of gas to a tolerable rate, in case some accident to the outer porcelain or zircon insulator may give the pressurized hydrogen an escape-path through this close sliding fit.

The bushing-construction of Fig. 3 also differs from that of Fig. 2A by having the mounting-flange or ring 69' of the bushing mounted on an intermediate portion of the outer surface of the inner insulating sleeve or tube 61, instead of being mounted, as in Fig. 2A, on the outer surface of a single porcelain insulator 62 extending substantially the entire length of the bushing. In Fig. 3, we use two tubular porcelain insulators 62A and 62B, disposed on the opposite sides of the mounting flange 69', with annular clearance-spaces surrounding the inner insulating sleeve 61.

In bushings of the highest voltage-ratings, it is usually desirable to use an oil filling or fillings in the annular spaces outside of the inner insulating sleeve 61 and inside of the respective porcelains 62A and 62B. In Fig. 3, a single oil-filling is used, for this purpose, as indicated by the oil-level 98, which is indicated near the top of the bushing, and the top head-member 64 is provided with a gaseous expansion-chamber 64', to take care of thermal expansions and contractions. The purpose of the oil is to increase the safety-margin in regard to the range between the voltage-withstanding ability of the bushing and the actual voltage-rating of the apparatus on which the bushing is applied. If an oil-filled bushing should lose its oil, because of breakage of the porcelains, it could still withstand the machine-voltage for a short while, but possibly there might be some corona present, in the higher-voltage sizes of the bushing.

According to our present invention, we depart from the usual practice, in regard to oil-filled bushings, by avoiding the use of several large holes 100 through the mounting-flange or ring 69'. Such holes have heretofore been used for joining the upper (inner) and lower (outer) oil-pockets which are inside of the upper and lower porcelains 62A and 62B respectively. These communicating-holes 100 make it possible to use a single body of oil with a single expansion-chamber 64', instead of having to use two, one for the part above the mounting-flange 69', and the other for the part below the mounting-flange 69'. According to our invention, we wish to limit the rate of escape of the hydrogen from the inside of the machine-housing 31 through these communicating-holes 100, in case of a failure or breakage of the porcelains 62A and 62B. To this end, we use only a single hole 100, as shown in Fig. 3, and we then provide a screw-plug 101 for almost completely closing this hole 100, so that the oil-expansion flow through said hole is limited to a slow rate, and consequently the hydrogen-leakage, when the oil has been lost, will be limited to a rate which is slow enough to be tolerated, so that the admission of reasonable amounts of additional hydrogen to the main machine-housing 31 will suffice to maintain the necessary or desired hydrogen-pressure within the machine.

According to our new bushing-design, as shown in Fig. 3, the inner insulating tube 61 (with its thin metal mounting-sleeve or bushing 61') is slidable with respect to the lead-in conductor 56—58 of the bushing. In this way, if the upper or inner porcelain 62A should break, so that it no longer holds up the upper head-member 64 of the bushing, the lead-in conductor 56—58 would be forced downwardly a small amount, by the hydrogen pressure, until this head-member 64 makes contacts with the top of the insulating tube 61 or its metal mounting-sleeve or bushing 61', so as to form a seal which prevents the escape of hydrogen, or at least limits such escape to a tolerable rate.

To take care of the possible breakage of the lower porcelain 62B, we provide interference between the internal parts of the lower head-member 65 and the bottom portion of the inner insulating tube 61 or its metal mounting-sleeve or bushing 61', so that the springs 66 will force up the slidable sleeve 61—61' so as to force the top end of this sleeve against the upper head-member 64, thus again shutting off hydrogen-leakage.

Aside from the dual-sealing provisions of the bushing-construction 53 which is shown in Fig. 3, this bushing has the same innercooling features which have already been described in connection with the bushing 51 in Fig. 2A.

So far, nothing has been said about the ventilation of the rotor-member 33. In all hydrogen-cooled generators having ratings which require the innercooling of the stator-winding 38, it is expected that it will always be found necessary to use innercooling for the rotor. Our illustrated machine shows such a construction, in which the rotor-member 33 is provided with a cylindrical rotor-core 103, which carries a two-pole innercooled or conductor-ventilated direct-current rotor-winding 104. This rotor-winding 104 can be designed to use either the same gas-moving pressure-head as the stator-winding 38, or it can use a different gas-moving pressure-means.

In the particular machine which is shown in Figs. 1, 2A and 2B, the innercooling rotor-winding ventilating-means is connected to the same high and low pressure-zones 82 and 83, which serve for the innercooling of the stator-winding 38, as indicated by the arrows 105 for the front-end rotor-winding ventilation, as shown in Fig. 2A. For the rear end, shown in Fig. 2B, some of the high-pressure gas 83, after passing through the coolers 84, is diverted back downwardly toward the shaft, as indicated by the arrow 106, and is lead through an under-blower inner passage or passageway 107 which extends axially underneath the blower 80, as shown in Fig. 2B, and as described and claimed in our previously mentioned pending application Serial No. 394,602.

The rotor-winding 104 is thus ventilated by having gas introduced, from the high-pressure zone 83—83', from both ends of the rotor. The gas is discharged from the rotor-winding by means (not shown) near the axial mid-point of the rotor-core 103, so that the air gap of the machine is a part of the return-flow low-pressure zone 82 at the rear end of the machine, as shown in Fig. 2B, and as described and claimed in our aforesaid application, Serial No. 394,602. At the front end of the machine, as shown in Fig. 2A, the air gap is substantially blocked off from the high-pressure zone 83', by means of an air-gap barrier 108, as also described and claimed in said last-mentioned application.

While we have shown our invention in only one or two illustrative forms of embodiment, and while there are many advantages in the precise illustrated forms, some of which advantages have been described, we wish to emphasize that, in the broadest aspects of the invention, we are not limited to all of the precise details shown, as we contemplate that certain changes may be made, by the omission of unwanted parts, or the addition of additional parts or safeguards, or the substitution of equivalents, without departing from the broadest aspects of the invention.

We claim as our invention:

1. A high-current electric machine having a gas-tight machine-housing having a filling of a gas under pressure, and a terminal-lead bushing through said machine-housing, said bushing comprising a gas-tight lead-in conductor, an insulating sleeve-member surrounding said lead-in conductor with a fit which is close enough to limit the escape of gas to a tolerable rate in case of accident, a mounting-flange carried by an intermediate portion of said insulating sleeve-member, inner and outer tubular housing-insulators disposed on the opposite sides of the mounting-flange with annular clearance-spaces surrounding said insulating sleeve-member, flanged head-members on the respective ends of the lead-in conductor for providing abutments for said housing-insulators, sealing-gasket means at each end of each of said housing-insulators, spring-means, disposed in one of said head-members, for keeping the several sealing-gasket means under compression, and a flexible diaphragm for maintaining a gas-tight condition in said head-member which has said spring-means.

2. The invention as defined in claim 1, including an oil filling in the two annular clearance-spaces within the two tubular housing-insulators, and a means for providing a restricted communication between said two annular clearance-spaces, said restricted communication being small enough to limit the escape of gas to a tolerable rate in case of accident.

3. A high-current electric machine having a gas-tight machine-housing having a filling of a gas under pressure, and a terminal-lead bushing through said machine-housing, said bushing comprising a gas-tight lead-in conductor, an insulating sleeve-member which is slidable on said lead-in conductor, a mounting-flange carried by an intermediate portion of said insulating sleeve-member, inner and outer tubular housing-insulators disposed on the opposite sides of the mounting-flange with annular clearance-spaces surrounding said insulating sleeve-member, flanged head-members on the respective ends of the lead-in conductor for providing abutments for said housing-insulators, sealing-gasket means at each end of each of said housing-insulators, spring-means, disposed in one of said head-members, for keeping the several sealing-gasket means under compression, and a flexible diaphragm for maintaining a gas-tight condition in said head-member which has said spring-means, the head-member at the inner end of said lead-in conductor being adapted to clamp down on the end of the insulating sleeve-member in the event of a breakage of the inner housing-insulator.

4. A high-current electric machine having a gas-tight machine-housing having a filling of a gas under pressure, a recirculating cooling system for providing relatively high and low pressure-zones for circulating said gas within said machine-housing, and a cooled terminal-lead bushing through said machine-housing, said bushing comprising a lead-in conductor-structure including two tubular members in substantially concentric spaced relation to each other, an insulating sleeve-member surrounding the outer one of said two tubular members with a fit which is close enough to limit the escape of gas to a tolerable rate in case of accident, a mounting-flange carried by an intermediate portion of said insulating sleeve-member, inner and outer tubular housing-insulators disposed on the opposite sides of the mounting-flange with annular clearance-spaces surrounding said insulating sleeve-member, flanged head-members on the respective ends of the lead-in conductor-structure for providing abutments for said housing-insulators, the outer head-member being gas-tight, sealing-gasket means at each end of each of said housing-insulators, spring-means, disposed in said outer head-member, for keeping the several sealing-gasket means under compression, a means, disposed within the bushing near said gas-tight outer head-member, for providing a direct communicating channel between the outer end of the inner tubular member and the outer end of the annular space between the two concentric tubular members, a means for providing a direct communicating channel between the inner end of the inner tubular member of the bushing and one of said two pressure-zones within the machine-housing, and a means for providing a direct communicating channel between the inner end of said annular space of the bushing and the other pressure-zone within the machine-housing.

5. The invention as defined in claim 4, including an oil filling in the two annular clearance-spaces within the two tubular housing-insulators, and a means for providing a restricted communication between said two annuler clearance-spaces, said restricted communication being small enough, to limit the escape of gas to a tolerable rate in case of accident.

6. A high-current electric machine having a gas-tight machine-housing having a filling of a gas under pressure, a recirculating cooling system for providing relatively high and low pressure-zones for circulating said gas within said machine-housing, and a cooled terminal-lead bushing through said machine-housing, said bushing comprising a lead-in conductor-structure including two tubular members in substantially concentric spaced relation to each other, an insulating sleeve-member which is slidable on the outer one of said two tubular members, a mounting-flange carried by an intermediate portion of said insulating sleeve-member, inner and outer tubular housing-insulators disposed on the opposite sides of the mounting-flange with annular clearance-spaces surrounding said insulating sleeve-member, flanged head-members on the respective ends of the lead-in conductor-structure for providing abutments for said housing-insulators, the outer head-member being gas-tight, sealing-gasket means at each end of each of said housing-insulators, spring-means, disposed in said outer head-member, for keeping the several sealing-gasket means under compression, the head-member at the inner end of said lead-in conductor being adapted to clamp down on the end of the insulating sleeve-member in the event of a breakage of the inner housing-insulator, a means, disposed within the bushing near said gas-tight outer head-member, for providing a direct communicating channel between the outer end of the inner tubular member and the outer end of the annular space between the two concentric tubular members, a means for providing a direct communicating channel between the inner end of the inner tubular member of the bushing and one of said two pressure-zones within the machine-housing, and a means for providing a direct communicating channel between the inner end of said annular space of the bushing and the other pressure-zone within the machine-housing.

7. A high-current dynamo-electric machine having a gas-tight machine-housing having a filling of a gas under pressure, a stator-member having a cylindrical-bore stator-core having winding-receiving slots, a two-layer ventilated-conductor alternating-current stator-winding having top and bottom half-coils with their coil-sides lying respectively in the tops and bottoms of the several slots, a plurality of ventilated-conductor, circumferentially extending, end-connectors at one end of the stator-winding, said end-connectors including a plurality of ventilated-conductor series connectors and a plurality of ventilated-conductor terminal-lead connectors, a plurality of ventilated-conductor terminal-lead bushings, electrical connections for connecting each series connector between two different bottom half-coils, electrical connections for connecting each terminal-lead conductor between one of the top half-coils and one of the terminal-lead bushings, and a recirculating cooling-system for said machine, said recirculating cooling-system including a gas-moving means for providing a relatively high-pressure stator-winding ventilating-zone of said gas at the end-connector end of the machine, and a relatively low-pressure stator-winding ventilating-zone of said gas at the other end of the machine, said recirculating cooling-system including a plurality of gas-inlet means in said high-pressure zone for admitting said gas into the ventilating portions of the stator-winding and the end-connectors, said inlets being disposed near the centers of the respective series connectors, near the winding-connection ends of the respective terminal-lead connectors, and at the ends of all stator-winding half-coils at that end of the machine except those to which the series connectors are connected, a means for discharging the gas from the ventilating portions of said series connectors to the ventilating portions of the half-coils to which they are electrically connected, a means for discharging the gas from the ventilating portions of said terminal-lead connectors to the ventilating portions of the bushings to which they are electrically connected, a plurality of gas-outlet means in said low-pressure zone for discharging the gas out of the ventilating portions of the stator-winding, and a means for discharging the gas from the ventilating portions of the several bushings to the aforesaid low-pressure zone.

References Cited in the file of this patent

UNITED STATES PATENTS

| | | |
|---|---|---|
| 1,706,810 | Paul | Mar. 26, 1929 |
| 2,052,831 | Journeau | Sept. 1, 1936 |
| 2,683,227 | Beckwith | July 6, 1954 |
| 2,695,368 | Kilbourne | Nov. 23, 1954 |
| 2,742,582 | Bahn | Apr. 17, 1956 |
| 2,742,583 | Beckwith | Apr. 17, 1956 |

FOREIGN PATENTS

| | | |
|---|---|---|
| 443,017 | Great Britain | Feb. 18, 1936 |
| 1,084,689 | France | July 13, 1954 |